United States Patent
Mahmoud et al.

(10) Patent No.: US 9,039,923 B2
(45) Date of Patent: May 26, 2015

(54) COMPOSITION OF ZEOTROPIC MIXTURES HAVING PREDEFINED TEMPERATURE GLIDE

(75) Inventors: Ahmad M. Mahmoud, Bolton, CT (US); Jaeseon Lee, Glastonbury, CT (US); Dong Luo, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 417 days.

(21) Appl. No.: 13/396,102

(22) Filed: Feb. 14, 2012

(65) Prior Publication Data

US 2013/0207021 A1    Aug. 15, 2013

(51) Int. Cl.
*C09K 5/04*    (2006.01)

(52) U.S. Cl.
CPC ........... *C09K 5/045* (2013.01); *C09K 2205/108* (2013.01); *C09K 2205/112* (2013.01); *C09K 2205/12* (2013.01); *C09K 2205/122* (2013.01)

(58) Field of Classification Search
CPC .......... C09K 5/04; C09K 5/045; C09K 5/044; F03C 99/00
USPC .................... 252/67, 68, 69; 60/531
See application file for complete search history.

(56) References Cited

U.S. PATENT DOCUMENTS

| | | | |
|---|---|---|---|
| 5,672,294 A * | 9/1997 | Lund et al. ....................... 252/67 |
| 5,866,029 A | 2/1999 | Lund et al. |
| 6,495,060 B2 | 12/2002 | Powell et al. |
| 6,500,359 B1 | 12/2002 | Bement et al. |
| 6,526,764 B1 * | 3/2003 | Singh et al. ........................ 62/84 |
| 6,951,115 B2 | 10/2005 | Yuzawa |
| 7,100,380 B2 | 9/2006 | Brasz et al. |
| 7,270,717 B2 * | 9/2007 | Knopeck et al. ................. 134/34 |
| 7,624,586 B2 | 12/2009 | Yuzawa et al. |
| 8,276,383 B2 * | 10/2012 | Sami ................................ 60/651 |
| 8,739,567 B2 * | 6/2014 | Junge .............................. 62/335 |
| 2008/0314073 A1 | 12/2008 | Minor |
| 2009/0107144 A1 * | 4/2009 | Moghtaderi et al. ......... 60/641.2 |
| 2009/0314015 A1 | 12/2009 | Minor et al. |
| 2010/0154419 A1 | 6/2010 | Kontomaris |
| 2011/0100009 A1 | 5/2011 | Lehar et al. |
| 2013/0327078 A1 * | 12/2013 | Junge .............................. 62/335 |

FOREIGN PATENT DOCUMENTS

| | | |
|---|---|---|
| CN | 101949369 | 1/2011 |
| JP | 2000516980 A | 12/2000 |
| KR | 20070100473 A | 10/2007 |
| WO | 2007/143051 | 12/2007 |
| WO | 2009/053726 | 4/2009 |
| WO | WO 2010081990 A1 * | 7/2010 |

OTHER PUBLICATIONS

M. Chys et al., "Potential of zeotropic mixtures as working fluids in organic Rankine cycles", Energy, 44 (2012), 623-632.*
English Translation of WO 2010/081990, Jul. 22, 2010.*
International Search Report and Written Opinion for International Application No. PCT/US2013/026036 completed Jun. 14, 2013.
International Preliminary Report on Patenability for PCT Application No. PCT/US2013/026036 mailed Aug. 28, 2014.

* cited by examiner

*Primary Examiner* — Douglas McGinty

(74) *Attorney, Agent, or Firm* — Carlson, Gaskey & Olds, P.C.

(57) ABSTRACT

A composition of a zeotropic mixture has a first chemical constituent and at least one second, different chemical constituent. The zeoptropic mixture has a temperature glide of 5° C.-25° C. with regard to its saturated vapor temperature and its saturated liquid temperature. The first chemical constituent is selected from 1,1,1,3,3-pentafluoropropane, 1,1,2,2,3-pentafluoropropane, 1,1,1,3,3-pentafluorobutane, methyl perfluoropropyl ether, 1,1,1,2,3,3-hexafluoropropane and 1,1,1,2,2,4,5,5,5-nonafluoro-4-(trifluoromethyl)-3-pentanone.

3 Claims, No Drawings

COMPOSITION OF ZEOTROPIC MIXTURES HAVING PREDEFINED TEMPERATURE GLIDE

STATEMENT REGARDING FEDERALLY SPONSORED RESEARCH OR DEVELOPMENT

This invention was made with government support under contract number DE-EE0002770 awarded by the U.S. Department of Energy. The government has certain rights in the invention.

BACKGROUND

This disclosure relates to working fluids for systems that utilize a Rankine cycle from a multitude of potential heat sources.

Working fluids are known and used in the Rankine cycle to convert heat into work. For example, power generation systems utilize pure fluids or azeotropic mixtures of fluids in an evaporator-condenser cycle to drive a turbine and generate power.

SUMMARY

Disclosed compositions include zeotropic mixtures of a first chemical constituent and at least one different chemical constituent. The zeotropic mixture has a temperature glide of 5° C.-25° C. The temperature glide is defined as the difference between the saturated vapor temperature and saturated liquid temperature for a given pressure. The first chemical constituent is selected from a group (A) of 1,1,1,3,3-pentafluoropropane, 1,1,2,2,3-pentafluoropropane, 1,1,1,3,3-pentafluorobutane, methyl perfluoropropyl ether, 1,1,1,2,3,3-hexafluoropropane, 1,1,1,2,2,4,5,5,5-nonafluoro-4-(trifluoromethyl)-3-pentanone and mixtures thereof.

In a further embodiment of the foregoing composition, the temperature glide is 8° C.-20° C.

In a further embodiment of the foregoing composition, the first chemical constituent is 1,1,1,3,3-pentafluoropropane.

In a further embodiment of the foregoing composition, the second chemical constituent is selected from a group (B) consisting of alkanes, alkenes and combinations thereof.

In a further embodiment of the foregoing composition, the second chemical constituent is selected from the group consisting of pentane, hexane, heptane, butane, dimethyl ethylene and mixtures thereof.

In a further embodiment of the foregoing composition, the second chemical constituent is selected from a group (C) consisting of 1,1-difluoroethane, fluoroethane, trifluoroiodomethane, dimethyl ethylene and combinations thereof.

In a further embodiment of the foregoing composition, the first chemical constituent is 1,1,2,2,3-pentafluoropropane.

In a further embodiment of the foregoing composition, the first chemical constituent is 1,1,1,3,3-pentafluorobutane.

In a further embodiment of the foregoing composition, the first chemical constituent is methyl perfluoropropyl ether.

In a further embodiment of the foregoing composition, the first chemical constituent is 1,1,1,2,3,3-hexafluoropropane.

In a further embodiment of the foregoing composition, the first chemical constituent is 1,1,1,2,2,4,5,5,5-nonafluoro-4-(trifluoromethyl)-3-pentanone.

In a further embodiment of the foregoing composition, the first chemical constituent includes 1,1,1,3,3-pentafluoropropane and 1,1,1,2,2,4,5,5,5-nonafluoro-4-(trifluoromethyl)-3-pentanone.

In a further embodiment of the foregoing composition, the first chemical constituent includes 1,1,1,3,3-pentafluoropropane and methyl perfluoropropyl ether.

In another aspect, a composition includes a zeotropic mixture that has a first chemical constituent and at least one second, different chemical constituent, the zeotropic mixture having a temperature glide of 5° C.-25° C. with regard to its saturated liquid temperature and its saturated vapor temperature, and the first chemical constituent is selected from a group (A) consisting of 1,1,1,3,3-pentafluoropropane, 1,1,2,2,3-pentafluoropropane, 1,1,1,3,3-pentafluorobutane, methyl perfluoropropyl ether, 1,1,1,2,3,3-hexafluoropropane, 1,1,1,2,2,4,5,5,5-nonafluoro-4-(trifluoromethyl)-3-pentanone and combinations thereof, and the second chemical constituent is selected from group (A), a group (B) consisting of alkanes, alkenes and combinations thereof or a group (C) consisting of 1,1-difluoroethane, fluoroethane, trifluoroiodomethane, dimethyl ethylene and combinations thereof.

In a further embodiment of the foregoing composition, the second chemical constituent is selected from group (B).

In a further embodiment of the foregoing composition, the second chemical constituent is selected from group (C).

In a further embodiment of the foregoing composition, the second chemical constituent is selected from group (A).

In a further embodiment of the foregoing composition, the first chemical constituent is 1,1,1,3,3-pentafluoropropane and the second chemical constituent is selected from group (B).

In a further embodiment of the foregoing composition, the zeotropic mixture has a composition selected from Table 1 herein.

In another aspect, the first chemical constituent is 1,1,1,3,3-pentafluoropropane and the second chemical constituent is selected from group (A), group (B) or a group (C).

In a further embodiment of the foregoing composition, the second chemical constituent is selected from group (B).

In a further embodiment of the foregoing composition, the second chemical constituent is selected from group (C).

In a further embodiment of the foregoing composition, the second chemical constituent is pentane.

DETAILED DESCRIPTION OF THE PREFERRED EMBODIMENT

In power generation systems that utilize an organic Rankine cycle, the selected organic working fluid influences the design, and thus the power output and efficiency, of the system. As an example, the design of a power generation system is limited by a pinch point of the heat exchanger(s) used in the system. The "pinch point" relates to the heat that is exchanged between two fluids in a heat exchanger and represents the minimum temperature difference between the fluids as they flow through the heat exchanger. A small pinch point corresponds to a "difficult" heat transfer and therefore requires greater heat exchange area. On the other hand, a large pinch point requires less heat exchange area. Thus, the pinch point determines the size, and thus the cost, of the required heat exchanger.

Disclosed herein is a composition of a zeotropic mixture for use in power generation systems that utilize the organic Rankine cycle. Power generation systems can vary, but at a minimum include a heat source, a turbine coupled to drive a generator and a heat exchanger through which the organic fluid mixture of the disclosed composition flows. In one example, the composition is zeotropic over or within the expected operating temperatures of organic Rankine cycle power generation systems, which is approximately 74° C.-200° C. (165° F.-392° F.), at a given constant pressure.

As an example, a thermal source fluid transfers heat from the heat source for thermal exchange with the disclosed zeotropic mixture. The thermal source fluid may be, for example, liquid and/or gas received from a geothermal reservoir, a combustion engine (e.g., a gas turbine engine, an internal combustion engine, etc.), a solar-thermal system, an incinerator or other waste to energy devices, or an industrial system or process. The thermal source fluid may be received from a heat source having a source temperature between, for example, about 360° K and 623° K. In other embodiments, the thermal source fluid may be a working fluid mixture received from another Rankine cycle system, which will be discussed below in further detail. Alternatively, the thermal source fluid may be omitted from the power generation system 10 where, for example, the evaporator is configured as a solar-thermal heating system (e.g., a system that heats the working fluid mixture directly via solar energy).

The composition exhibits good power efficiency and heat transfer in power generation systems, and relaxes or eliminates the pinch point limitation. Furthermore, the disclosed composition can be tailored to enhance performance and power output. For example, the disclosed composition allows up to 40% more net-site power for the equivalent available energy in geothermal or other resources and allows use of reduced amounts of working fluid by up to 50% relative to pure working fluids.

The zeotropic mixture includes a first chemical constituent and at least one different chemical constituent. The zeotropic mixture has a temperature glide of 5° C.-25° C. with regard to the saturated vapor temperature and the saturated liquid temperature of the mixture at a given constant pressure, such as the evaporating and condensing pressures prevalent in ORC power systems. In a further example, the temperature glide is 8° C.-20° C.

The temperature at which a substance first begins to boil is the saturated liquid temperature and the temperature at which the last drop of the substance has boiled is the saturated vapor temperature. These temperatures can be measured experimentally using known standards and testing devices, for example. The difference between the saturated vapor temperature and the saturated liquid temperature is the temperature glide. The temperature glide is a function of the selected chemical constituents and amounts in the composition and thus can be adjusted to achieve a predetermined target temperature glide within the given range. It is this temperature glide that permits relaxation or elimination of the pinch point in the design of a power generation system that is based on the Rankine cycle.

The first chemical constituent of the zeotropic mixture is selected from a group (A) of 1,1,1,3,3-pentafluoropropane (R245fa), 1,1,2,2,3-pentafluoropropane (R245ca), 1,1,1,3,3-pentafluorobutane (R365mfc), methyl perfluoropropyl ether (HFE-7000), 1,1,1,2,3,3-hexafluoropropane (R236a), 1,1,1,2,2,4,5,5,5-nonafluoro-4-(trifluoromethyl)-3-pentanone (NOVEC 649) and combinations thereof.

The second chemical constituent is selected from group (A), a group (B) of alkanes, alkenes or combinations thereof, or a group (C) of 1,1-difluoroethane (R152a), fluoroethane (R161), trifluoroiodomethane (CF3I), dimethyl ethylene (dme) and combinations thereof. In a further example, the alkanes, alkenes or combination thereof is selected from the group of pentane, hexane, heptane and butane. The chemical constituents listed in group (B) refer to the generic chemical compositions and structural isomers (e.g. pentane, isopentane, neopentane) and their monocyclic configurations (e.g. cyclopentane).

The amounts of the first and second chemical constituents are selected in the composition to provide the given temperature glide, which can be determined experimentally or from phase equilibrium diagrams. Table 1 below shows example combinations of the first chemical constituent and the second chemical constituent and their relative amounts in parts by weight.

TABLE 1

| | | concentration (parts by weight percent) | |
|---|---|---|---|
| first chemical constituent | second chemical constituent | first chemical constituent | second chemical constituent |
| 1,1,1,3,3-pentafluoropropane | pentane | 70-5 | 30-95 |
| 1,1,2,2,3-pentafluoropropane | cyclohexane | 30-5 | 70-95 |
| 1,1,1,3,3-pentafluoropropane | hexane | 45-5 | 55-95 |
| 1,1,1,3,3-pentafluoropropane | isohexane | 50-5 | 50-95 |
| 1,1,1,3,3-pentafluorobutane | heptane | 60-20 | 40-80 |
| methyl perfluoropropyl ether | cyclohexane | 75-20 | 25-80 |
| 1,1,1,3,3-pentafluoropropane | 1,1-difluoroethane | 55-25 | 45-75 |
| 1,1,1,2,3,3-hexafluoropropane | fluoroethane | 70-45 | 30-55 |
| 1,1,1,2,2,4,5,5,5-nonafluoro-4-(trifluoromethyl)-3-pentanone | isobutene | 75-5 | 25-95 |
| 1,1,1,2,2,4,5,5,5-nonafluoro-4-(trifluoromethyl)-3-pentanone | 1,1,2,2,3-pentafluoropropane | 55-5 | 45-95 |
| 1,1,1,2,2,4,5,5,5-nonafluoro-4-(trifluoromethyl)-3-pentanone | 1,1,1,2,3,3-hexafluoropropane | 50-35 | 50-65 |
| 1,1,1,3,3-pentafluorobutane | isobutane | 50-15 | 50-85 |
| 1,1,1,3,3-pentafluorobutane | 1,1-difluoroethane | 35-10 | 65-90 |
| trifluoroiodomethane | 1,1,1,3,3-pentafluoropropane | 75-35 | 25-65 |
| 1,1,1,2,2,4,5,5,5-nonafluoro-4-(trifluoromethyl)-3-pentanone | dimethyl ethylene | 50-15 | 50-85 |
| 1,1,1,2,2,4,5,5,5-nonafluoro-4-(trifluoromethyl)-3-pentanone | heptane | 95-55 | 5-45 |
| 1,1,1,2,2,4,5,5,5-nonafluoro-4-(trifluoromethyl)-3-pentanone | isobutane | 60-20 | 40-80 |
| 1,1,1,2,2,4,5,5,5-nonafluoro-4-(trifluoromethyl)-3-pentanone | propane | 35-15 | 65-85 |

TABLE 1-continued

| | | concentration (parts by weight percent) | |
|---|---|---|---|
| first chemical constituent | second chemical constituent | first chemical constituent | second chemical constituent |
| 1,1,1,2,2,4,5,5,5-nonafluoro-4-(trifluoromethyl)-3-pentanone | fluoroethane | 40-15 | 60-85 |
| 1,1,1,2,2,4,5,5,5-nonafluoro-4-(trifluoromethyl)-3-pentanone | 1,1,2,2,3-pentafluoropropane | 95-65 | 5-35 |
| 1,1,1,2,2,4,5,5,5-nonafluoro-4-(trifluoromethyl)-3-pentanone | t2butene | 80-25 | 20-75 |
| 1,1,1,2,2,4,5,5,5-nonafluoro-4-(trifluoromethyl)-3-pentanone | cyclohexane | 95-70 | 5-30 |
| methyl perfluoropropyl ether | butane | 95-55 | 5-45 |
| methyl perfluoropropyl ether | 1butene | 95-45 | 5-55 |
| methyl perfluoropropyl ether | C2butene | 95-60 | 5-40 |
| methyl perfluoropropyl ether | dimethyl ethylene | 60-15 | 40-85 |
| methyl perfluoropropyl ether | hexane | 90-20 | 29495 |
| methyl perfluoropropyl ether | isobutene | 90-45 | 20363 |
| methyl perfluoropropyl ether | isohexane | 80-35 | 20-65 |
| methyl perfluoropropyl ether | isobutane | 70-40 | 30-60 |
| methyl perfluoropropyl ether | 1,1,2,2,3-pentafluoropropane | 50-35 | 50-85 |
| methyl perfluoropropyl ether | fluoroethane | 40-15 | 60-85 |
| methyl perfluoropropyl ether | t2butene | 95-55 | 5-45 |
| 1,1,1,3,3-pentafluoropropane | dimethyl ethylene | 70-45 | 30-55 |
| 1,1,1,3,3-pentafluoropropane | isopentane | 55-20 | 45-80 |

In embodiments where the first chemical constituent and the second chemical constituent are the only substances in the composition, the parts by weight are weight percentages and sum to 100%. In further embodiments, the composition additionally includes other substances with the first chemical constituent and the at least one different constituent. Thus, the amounts of the first and second chemical constituents in Table 1 also represent a scalable ratio with regard to the relative amounts of the first and second chemical constituents. In further examples, the additional substances include additives to modify the properties of the composition. For example, the additives can include flammability inhibitors, oils, lubricants, heat transfer enhancement agents or other modifying-agents. Generally, these additives constitute approximately 5 wt % or less of the composition.

In further embodiments, the composition of the zeotropic mixture mixture also includes one or more additional chemical components and/or compounds selected to, for example, enhance system performance, enhance heat transfer between Rankine cycle fluids, enhance diagnostics, provide fire suppression, provide lubrication, provide fluid stabilization, provide corrosion resistance, etc. The composition of the zeotropic mixture includes, for example, flammability inhibitors, oils, lubricants, heat transfer enhancement agents, tracers, etc.

The disclosed composition is also designed to meet or improve environmental impact with regard to ozone depletion, global warming potential, greenhouse gases, flammability, toxicity, etc.

In embodiments, the composition of the zeotropic mixture is also selected to exhibit other characteristics during the Rankine cycle such as, for example, low global warming potential (GWP), low flammability, low ozone depletion potential, low toxicity, etc. The term "global warming potential" is a relative measure of how much heat a greenhouse gas traps in the atmosphere relative to carbon dioxide for the atmospheric lifetime of the species. The global warming potential of carbon dioxide is standardized to 1. In one example, the GWP of the composition of the zeotropic mixture mixture is, for example, less than about 675. In a further example, the GWP is 150-250 and the zeotropic mixture is non-flammable.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A composition comprising:
   a zeotropic mixture including, by weight, 15-5% of a first chemical constituent and 85-95% of at least one second, different chemical constituent, the zeotropic mixture having a temperature glide of 5° C.-25° C. with regard to its saturated liquid temperature and its saturated vapor temperature, wherein the first chemical constituent is 1,1,1,3,3-pentafluoropropane and the second chemical constituent is pentane.

2. The composition as recited in claim 1, wherein the temperature glide is 8° C.-20° C.

3. The composition as recited in claim 1, wherein the zeotropic mixture includes an additive selected from the group consisting of flammability inhibitors, oils, lubricants, heat transfer enhancement agents, and combinations thereof, and the zeotropic mixture includes, by weight, less than 5% of the additive.

* * * * *